United States Patent
Benanti et al.

(10) Patent No.: US 9,683,158 B2
(45) Date of Patent: *Jun. 20, 2017

(54) WORKING FLUIDS COMPRISING FLUORINATED OLEFINS AND POLYOL ESTERS

(71) Applicant: Chemtura Corporation, Middlebury, CT (US)

(72) Inventors: Travis Benanti, Farmington, CT (US); Roberto Urrego, Newington, CT (US); Edward T. Hessell, Fairfield, CT (US)

(73) Assignee: LANXESS SOLUTIONS US, INC., Middlebury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,671

(22) Filed: May 24, 2016

(65) Prior Publication Data

US 2016/0376485 A1    Dec. 29, 2016

Related U.S. Application Data

(60) Provisional application No. 62/185,341, filed on Jun. 26, 2015.

(51) Int. Cl.
| | | |
|---|---|---|
| *C09K 5/04* | (2006.01) | |
| *C10M 171/00* | (2006.01) | |
| *C10M 105/38* | (2006.01) | |

(52) U.S. Cl.
CPC ........... *C09K 5/045* (2013.01); *C10M 105/38* (2013.01); *C10M 171/008* (2013.01); *C09K 2205/104* (2013.01); *C09K 2205/126* (2013.01); *C10M 2207/2835* (2013.01); *C10N 2220/022* (2013.01); *C10N 2220/302* (2013.01); *C10N 2230/02* (2013.01); *C10N 2230/74* (2013.01); *C10N 2240/30* (2013.01)

(58) Field of Classification Search
CPC .............. C09K 5/045; C09K 2205/126; C09K 2205/104; C10M 171/008; C10N 2030/00; C10N 2030/08; C10N 2030/06; C10N 2040/30

USPC .......................................................... 252/68
See application file for complete search history.

(56) References Cited

U.S. PATENT DOCUMENTS

| | | | |
|---|---|---|---|
| 3,670,013 A | 6/1972 | Leibfried | |
| 5,964,581 A | 10/1999 | Iizuka et al. | |
| 6,444,626 B1 | 9/2002 | McHenry et al. | |
| 8,318,647 B2 | 11/2012 | Carr et al. | |
| 8,603,354 B2 | 12/2013 | Kaneko | |
| 8,852,449 B2 * | 10/2014 | Carr ................... | C10M 171/008 252/68 |
| 9,187,682 B2 * | 11/2015 | Rebrovic ............... | C09K 5/045 |
| 9,255,219 B2 * | 2/2016 | Rebrovic ............... | C09K 5/045 |
| 9,334,463 B2 * | 5/2016 | Kaneko ................. | C09K 5/045 |
| 9,505,967 B2 * | 11/2016 | Benanti ................. | C09K 5/045 |
| 2005/0014660 A1 | 1/2005 | Carr et al. | |
| 2010/0181523 A1 | 7/2010 | Kelley et al. | |
| 2011/0240910 A1 | 10/2011 | Carr et al. | |
| 2012/0011864 A1 | 1/2012 | Leck et al. | |
| 2013/0092869 A1 | 4/2013 | Boussand | |
| 2013/0096218 A1 | 4/2013 | Rached et al. | |
| 2013/0099154 A1 | 4/2013 | Boussand et al. | |
| 2013/0200295 A1 * | 8/2013 | Rebrovic ............... | C09K 5/045 252/68 |
| 2015/0027146 A1 * | 1/2015 | Boussand ............. | C09K 5/045 62/84 |
| 2016/0053153 A1 * | 2/2016 | Okido ................... | C09K 5/045 252/68 |
| 2016/0281017 A1 * | 9/2016 | Tsaih ................... | C10M 105/38 |

OTHER PUBLICATIONS

PCT International Search Report and Written Opinion dated Aug. 12, 2016 from corresponding Application No. PCT/US2016/034947, 11 pages.

* cited by examiner

*Primary Examiner* — Douglas McGinty
(74) *Attorney, Agent, or Firm* — Dilworth IP LLC

(57) ABSTRACT

High viscosity working fluids comprising a fluorinated olefin refrigerant, such as a hydrofluoro-olefin refrigerant, and a high viscosity polyol ester comprising a select mixture of alkylcarboxy esters of pentaerythritol, di-pentaerythritol, tri-pentaerythritol and pentaerythritol oligomers are provided.

16 Claims, No Drawings

_US 9,683,158 B2_

WORKING FLUIDS COMPRISING FLUORINATED OLEFINS AND POLYOL ESTERS

This application claims benefit under 35 USC §119(e) of U.S. Provisional Application No. 62/185,341 filed Jun. 26, 2015, the disclosure of which is incorporated herein by reference.

Provided are working fluids comprising a fluorinated olefin refrigerant, such as a hydrofluoro-olefin refrigerant, and a high viscosity, polyol ester lubricant comprising a select mixture of alkylcarboxy esters of pentaerythritol, di-pentaerythritol, tri-pentaerythritol and higher pentaerythritol oligomers.

BACKGROUND

Heat transfer devices such as refrigerators, freezers, heat pumps and air conditioning systems are well known. In simple terms such devices typically operate via a cycle wherein a refrigerant of a suitable boiling point evaporates at low pressure taking heat from its surroundings, the vapor passes to a condenser where it condenses back to a liquid and gives off heat to its new surroundings, before returning to the evaporator completing the cycle. In addition to the mechanical parts, such as a compressor etc., specially suited materials are needed, including refrigerant, heat transfer materials, sealants to prevent loss of refrigerant and lubricants to allow for functioning of the movable parts. The lubricant in these devices must have good low temperature flow properties, be thermally stable, provide protection against wear of moving parts such as bearings under load, remove heat from the compressor and seal clearances to ensure efficient compression of gas from low to high pressure.

The refrigerant and the lubricating oil must circulate in the system without undergoing phase separation over a wide temperature range. In many cases there is a temperature below which the refrigerant and the lubricating oil undergo phase separation and there may also be a temperature above which they undergo phase separation. In general, a useful working fluid at a minimum will not undergo phase separation between 0 and 50° C., in many cases from below 0° C. to at least 60° C. That is, phase separation of refrigerant and lubricating oil in a useful working fluid in the low end will of the temperature range typically occurs below 0° C., e.g., temperatures below −10° C. or −20° C., and at the high end of the temperature range any phase separation should occur only at temperatures above 50° C., and in many devices, 60° C. or higher.

Excessive solubility of the refrigerant in the lubricant can also can also be problematic. For example, high concentrations of refrigerant in the lubricant can greatly reduce lubricant viscosity, leading to increased wear, shortened lifetime and lower performance of the device. Dissolved refrigerant in the lubricant can also cause foaming and bubbling of the lubricant mixture as it flows from one area of the compressor to another, e.g., from low to high temperature regions. Furthermore, refrigerant dissolved in the lubricant is essentially trapped and taken out of circulation, thereby reducing the cooling capacity of the system. As efficient functioning of a refrigeration lubricant requires not just proper lubricating properties and appropriate viscosities, but also appropriate compatibility with the refrigerant, changes in refrigerant frequently demand corresponding changes in lubricant.

U.S. Pat. No. 5,964,581 discloses polyol ester lubricants prepared by the condensation of pentaerythritol and monocarboxylic acids that are miscible with highly or fully fluorinated hydrocarbons such as 1,1,1,2-tetrafluoroethane, commonly known as HFC-134a, difluoromethane (HFC-32), trifluoromethane (HFC-23), pentafluoroethane (HFC-125), 1,1,2,2-tetrafluoroethane (HFC-134), 1,1,1-trifluoroethane (HFC-143a) and the like.

U.S. Pat. No. 6,444,626 discloses lubricants comprising poly(pentaerythritol) esters which contain mixtures of pentaerythritol esters, di-pentaerythritol esters, tri-pentaerythritol esters, tetra-pentaerythritol and higher oligomeric pentaerythritol esters, blended with a hindered polyol ester. U.S. Pat. No. 8,318,647 discloses refrigeration lubricants comprising select mixtures of carboxy esters of pentaerythritol, di-pentaerythritol and tri-pentaerythritol.

Concern about ozone depletion led to the replacement of chlorofluorocarbon refrigerants with alternate materials, such as highly or fully fluorinated hydrocarbons; and concern about climate change is leading to replacement, at least in part, of the presently used fluorinated alkanes with fluorinated olefins, e.g., hydrofluoro-olefin refrigerants (HFO), having a significantly lower global warming potential (GWP). For example, the fluorinated alkane refrigerant R-134a has a GWP of 1430; the fluorinated alkene R-1234ze (1,3,3,3-tetrafluoropropene) has a GWP of only 6 or less.

Ideally, hydrofluoro-olefin refrigerants would serve as "drop-in" replacements for the presently used fluorinated alkanes in refrigeration working fluids. However, it is not uncommon with refrigeration working fluids that changes in the refrigerant, or the conditions under which the working fluid is used, require changes in the lubricant. Even though many hydrofluoro-olefins are structurally similar to commercial saturated hydrofluorocarbons, simple replacement of saturated hydrofluorocarbons with hydrofluoro-olefins in the existing lubricant compositions has presented a number of challenges. For example, certain commercial hydrofluoro-olefins are much more miscible with polyester lubricant compositions than the saturated fluorocarbons that they would likely replace, which can cause unacceptable reduction in viscosity. As a result, mixtures of fluorinated olefins with fluorinated alkanes have been developed, as have miscibility additives for use with refrigerants such as hydrofluoro-olefins and various lubricants.

U.S. Published Patent Application No. 2013/0096218 discloses heat transfer compositions comprising mixtures of tetrafluoropropene, difluoromethane and tetrafluoroethane. U.S. Published Patent Application No. 2013/0092869 discloses a composition comprising polyol esters and a mixture of tetrafluoropropene, pentafluoropropene, and trifluoropropyne. U.S. Published Patent Application No. 2012/0011864 discloses the use of perfluoro-polyethers as additives to improve the characteristics of a wide variety of fluorinated refrigerants including hydrofluoro-olefins.

U.S. Pat. No. 8,603,354 discloses lubricating oil compositions for use with fluorine-containing refrigerants having a specific polar structure and a low global warming potential. Exemplified refrigerants include fluorinated ketones, fluorinated ethers and fluorinated alcohols.

U.S. Published Patent Application No. 2013/0099154 discloses a composition comprising polyol esters and tetrafluoropropene, however only ISO 68 lubricants are exemplified.

In some applications, refrigeration fluids containing lubricants having significantly higher viscosity are required, e.g., 150 centistokes or higher at 40° C., such as 160 to 350 centistokes at 40° C. and in some applications 190 cSt, 200 cSt, or higher and lubricants of ISO grade 220 to ISO 320 may be specified. High viscosity polyester lubricants have been formed from dipentaerythritol and higher molecular weight carboxylic acids, or alternatively, dicarboxylic acids are reacted with polyols to form complex esters, however difficulties arise when highly fluorinated hydrocarbons are used with these traditional higher viscosity polyester lubricants. It has also been found that these difficulties can become more pronounced when saturated hydrofluorocarbons are replaced with unsaturated fluorinated refrigerants, as seen with the enhanced miscibility of hydrofluoro-olefins referred to above.

Polyol esters based on pentaerythritol or di-pentaerythritol typically require branched acids (e.g., iso-$C_9$ acid, i.e., 3,5,5-trimethylhexanoic acid) or very long-chain acids (e.g., n-$C_{18}$ acids) to achieve high viscosity. However, POEs containing enough iso-$C_9$ acid to obtain the desired high viscosity of the neat oil are often fully miscible with hydrofluoro-olef ins, such as R-1234ze. These highly branched POEs also exhibit a high affinity for the refrigerant (i.e., high solubility of the refrigerant in the oil), which causes a large decrease in viscosity of the working fluid and insufficient lubrication. On the other hand, POEs containing very long linear chain acids are immiscible with R-1234ze and are not viable candidates for refrigeration applications. Likewise, esters from di- or poly-carboxylic acids tend to be incompatible and/or unstable when used with hydrofluoro-olefins.

U.S. Pat. No. 6,774,093 discloses high viscosity polyol ester lubricants, comprising 30 to 45 wt % mono-pentaerythritol esters, 30 to 45 wt % di-pentaerythritol esters, and 23 to 50 wt % esters of tri and higher pentaerythritol oligomers for use in working fluids comprising fluorinated or highly fluorinated alkanes. In one example, an ISO 220 viscosity grade lubricant prepared from a mixture of $C_5$ and $C_9$ carboxylic acids wherein 78 mol % of the carboxylate groups are branched are shown to have good miscibility with tetrafluoroethane R-134a. However, the miscibility characteristics of fluorinated alkanes can differ greatly from the miscibility characteristics of fluorinated olefins, and as shown herein, polyolesters similar to those of U.S. Pat. No. 6,774,093 comprising $C_5$ and branched $C_9$ alkylcarboxylates demonstrate miscibility with the fluorinated olefin R-1234ze that is unsuitable for certain applications.

U.S. Published Patent Application No. 2010/0181523 discloses $CO_2$ refrigeration working fluids comprising mono-pentaerythritol esters, di-pentaerythritol esters, esters of tri and higher pentaerythritol oligomers, wherein the alkyl carboxylate groups are linear alkyl carboxylates of 7 or more carbon atoms. U.S. Published Patent Application No. 2011/0240910 discloses $CO_2$ refrigeration working fluids comprising mono-pentaerythritol esters, di-pentaerythritol esters, and esters of tri and higher pentaerythritol oligomers, wherein at least 50% of all alkyl carboxylate groups are linear alkyl carboxylates of 3 to 6 carbon atoms. While the $CO_2$ refrigeration working fluids may also contain a halocarbon refrigerant, polyesters with a high percentage of linear carboxylate groups are not suitably miscible with the refrigerant when hydrofluoro-olefins are the predominate or sole refrigerant, as shown herein.

It has been found that high viscosity lubricants, i.e., lubricants with a kinematic viscosity at 40° C. of at least 150 cSt or higher, often 160 or higher, and in some cases 190 cSt, 200 cSt or higher, comprising certain mixtures of particular mono-carboxylic acids and pentaerythritol, di-pentaerythritol, and tri and higher pentaerythritol oligomers can be used with hydrofluoro-olefin refrigerants such as R-1234ze (1,3, 3,3-tetrafluoropropene) to form high viscosity refrigeration working fluids without demonstrating the excessive refrigerant/lubricant solubility that can lead to an unacceptable decrease in viscosity, poor lubrication, wear foaming and capacity loss.

SUMMARY

This invention provides a working fluid comprising a fluorinated-olefin refrigerant and a polyol ester lubricant composition, which polyol ester lubricant composition has a kinematic viscosity at 40° C. of from 150 to 360 cSt, e.g., 160 cSt, 190 cSt, 200 cSt or higher and comprises:

a) from 25 to 40 wt % $C_{5-12}$ alkylcarboxy esters of mono-pentaerythritol, b) from 15 to 25 wt % $C_{5-12}$ alkylcarboxy esters of di-pentaerythritol, and c) from 40 to 55 wt % $C_{5-12}$ alkylcarboxy esters of tri-pentaerythritol and higher pentaerythritol oligomers, wherein from 55 to 100 mol % of the alkylcarboxy groups are selected from $C_{7-10}$ alkylcarboxy, and from 50 to 80 mol %, e.g., 55 to 80 mol % of all alkylcarboxy groups are branched.

The polyol ester lubricant composition of the inventive working fluid typically has a kinematic viscosity at 40° C. of from 160 to 360 cSt, e.g., from 190 to 360 cSt, and in some embodiments from 194 to 325 cSt; and a kinematic viscosity at 100° C. of from 10 to 30 cSt or 15 to 30 cSt, e.g., from 18 to 27 cSt, and in some embodiments from 20 to 25 cSt. Typically, there is no reason to exceed a kinematic viscosity at 40° C. of 360 cSt or 340 cSt, and because such highly viscous materials are difficult to work with, many embodiments of the invention use a lubricant having a kinematic viscosity at 40° C. of from 190 or 194 cSt to 340 cSt.

The fluorinated-olefin refrigerants, e.g., hydrofluoro- or perfluoro-olefins, typically hydrofluoro-olefins, and the lubricant of the invention are miscible throughout the operating range of most heat transfer devices, and in particular, devices that require the high viscosity of the inventive polyester composition. For example, when the refrigerant of the working fluid is the tetrafluoro propene, R-1234ze, phase separation of the working fluid at a concentration of 10% oil in the refrigerant occurs below 0° C. at the low end of the operating range, e.g., from about −10 to about −45° C., and at temperatures of 60° C. or higher at the high end of the operating range, in many embodiments 70° C. or higher. Generally, the phase separation at the high end of the operating range for R-1234ze at 5% oil in the refrigerant is also 60° C. or higher and most often 70° C. or higher.

The inventive working fluids are well suited for use with positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, rotary (rolling piston, rotary vane, single screw, twin screw), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

The high viscosity polyol ester lubricant of the invention is ideally suited for use in working fluids comprising hydrofluoro-olefin refrigerants, demonstrating desirable miscibility characteristics along with excellent lubricity and load bearing properties, even under high pressures and severe operating conditions. The working fluids of the invention are compatible with standard additives common in the field.

DETAILED DESCRIPTION

The working fluid of the invention comprises i) a fluorinated olefin refrigerant, e.g., a hydrofluoro-olefin refrigerant, and ii) a particular high viscosity polyol ester lubricant composition.

The polyol ester lubricant composition has a kinematic viscosity at 40° C. of from 190 to 360 cSt, e.g., from 190 to 340 cSt, and comprises
 a) from 25 to 40 wt % $C_{5-12}$ alkylcarboxy esters of mono-pentaerythritol,
 b) from 15 to 25 wt % $C_{5-12}$ alkylcarboxy esters of di-pentaerythritol, and
 c) from 40 to 55 wt % $C_{5-12}$ alkylcarboxy esters of tri-pentaerythritol and higher pentaerythritol oligomers,
wherein from 55 to 100 mol % of the alkylcarboxy groups are selected from 07-10 alkylcarboxy, and from 50 to 80 mol % of all alkylcarboxy groups are branched. In many embodiments, 55 to 80 mol % of the alkylcarboxy groups are branched.

In various embodiments, the polyol ester lubricant composition comprises, for example,
 a) from 28 to 40 wt %, e.g., from 30 to 40 wt % or from 33 to 40 alkylcarboxy esters of mono-pentaerythritol,
 b) from 15 to 25 wt %, 16 to 24 or 17 to 22 wt % alkylcarboxy esters of di-pentaerythritol, and
 c) from 40 to 54 wt %, 42 to 54 wt % or 40 to 50 wt % alkylcarboxy esters of tri-pentaerythritol and higher pentaerythritol oligomers.

For example, in some embodiments the polyol ester lubricant composition comprises,
 a) from 25 to 40 wt % alkylcarboxy esters of mono-pentaerythritol,
 b) from 15 to 25 wt % alkylcarboxy esters of di-pentaerythritol, and
 c) from 40 to 55 wt % alkylcarboxy esters of tri-pentaerythritol and higher pentaerythritol oligomers.

For example, in certain embodiments, e.g., at least 28, 29, 30, 31, 32, 33 or 34 wt % of the above alkylcarboxy esters are mono-pentaerythritol carboxy esters, and in some embodiments no more than 39, 38 or 37 wt % are mono-pentaerythritol carboxy esters;
in certain embodiments e.g., at least 16, 17 or 18 wt %, of the above alkylcarboxy esters are di-pentaerythritol carboxy esters and in some embodiments no more than 23, 22 or 21 wt % are di-pentaerythritol carboxy esters; and
in certain embodiments at least 40, 41 or 42 wt % of the above alkylcarboxy esters are esters of tri-pentaerythritol and higher pentaerythritol oligomers, and in some embodiments no more than 54, 53, 52, 51, 50 or 48 wt % are esters of tri-pentaerythritol and higher pentaerythritol oligomers.

The alkylcarboxy groups are selected from $C_{5-12}$ alkylcarboxy, for example from $C_{5-10}$ alkylcarboxy, and at least 55 mol % are $C_{7-10}$ alkylcarboxy, e.g., 55 to 100 mol %, 60 to 100 mol %, 70 to 100 mol %, 80 to 100 mol %, or 90 to 100 mol %, and in particular embodiments 50 mol %, 55 mol %, 60 mol %, 70 mol %, 75 mol %, 80 mol %, 85 mol %, 90 mol % or more are $C_{8-10}$ alkylcarboxy.

From 50 to 80 mol % of all alkylcarboxy groups in the polyol ester composition are branched. In many embodiments 55 to 80 mol % or 55 to 75 mol % of the alkylcarboxy groups are branched. Often, the branched alkylcarboxy groups are highly branched, e.g., they contain multiple branching sites and/or more than one group at a single site. For example, in certain embodiments, the majority, i.e., 51 to 100 mol % of the branched alkylcarboxy groups are 3,5,5-trimethylhexanoyl or 2,2,4,4-tetramethylbutanoyl, often 3,5,5-trimethylhexanoyl.

The alkylcarboxy groups of the inventive polyol ester lubricant are mono-carboxylates, and less than 5 mol %, typically less than 2 mol %, and often none of the carboxylates are derived from di- or poly-carboxylic acids.

The polyol ester lubricant composition of the inventive working fluid typically has a kinematic viscosity at 40° C. of at least 150, 160, 170, 180, 190 cSt or higher, e.g., at least 194 or at least 200 cSt. While there is no particular limit to how high the viscosity may be, in general the kinematic viscosity at 40° C. of the polyol ester composition reaches a useful upper limit of 400 cSt, but such fluids are difficult to work with, and in particular embodiments there is no reason to exceed 360 cSt or 340 cSt, and in many embodiments 320 or 325 cSt at 40° C. is sufficiently high in viscosity.

The viscosity of the polyol ester lubricant in the presence of the refrigerant under the conditions of use is of primary concern, and this may be depressed by the amount of refrigerant dissolved therein. The instant polyol esters of the invention having the above viscosity differ from many similar polyolesters known in the art in that they do not generally dissolve so much hydrofluoro olefin refrigerant that the viscosity of the working fluid is unacceptably reduced, and therefore provide a working fluid with acceptable viscosity when blended with fluorinated olefin refrigerants and additives as typically found in the art.

The mixture of polyol esters may be prepared by simple esterification of the appropriate pentaerythritol, dipentaerythritol, and poly(pentaerythritol)s, however this requires obtaining the individual polyols as starting materials. The polyol ester composition is more conveniently prepared by a two-step process analogous to that described in, e.g., U.S. Pat. Nos. 3,670,013, 6,444,626, 8,318,647 and the like.

Other lubricants may be present in the working fluid, such as polyalphaolefins, polyalkylene glycols, alkylated aromatics, polyethers, mineral oils, phosphoric acid ester, other ester based lubricants, vegetable oils etc., however, the combination of polyol esters defined above is the majority lubricant component, typically comprising at least 80, 90, 95, or 98 wt % of the lubricant base stock, and in many embodiments, the polyol ester composition described above is the only lubricant in the inventive working fluid. Care must be used when adding other lubricant base stocks so that the desirable properties of the polyol ester composition relative to its use with hydrofluoro-olefins are not diminished.

While other similar polyol esters possess a variety of useful properties, they do not typically exhibit the full complement of performance criteria, that is, both lubricating properties and fluoro-olefin miscibility, e.g., hydrofluoro-olefin miscibility, required for the present high viscosity working fluids.

The highly fluorinated olefin refrigerants of the invention are known in the art, e.g., U.S. Published Patent Application No. 2012/0011864, and include E and Z isomers of, e.g.,
 1,2,3,3,3-pentafluoro-1-propene; 1,1,3,3,3-pentafluoro-1-propene; 1,1,2,3,3-pentafluoro-1-propene; 1,2,3,3-tetrafluoro-1-propene; 2,3,3,3-tetrafluoro-1-propene; 1,3,3,3-tetrafluoro-1-propene; 1,1,2,3-tetrafluoro-1-propene; 1,1,3,3-tetrafluoro-1-propene; 1,2,3,3-tetrafluoro-1-propene; 3,3,3-trifluoro-1-propene; 2,3,3-trifluoro-1-propene; 1,1,2- trifluoro-1-propene; 1,2,3-trifluoro-1-propene; 1,1,3-trifluoro-1-propene; 1,3,3-trifluoro-1-propene;

1,1,1,2,4,4,4-heptafluoro-2-butene; 1,2,3,3,4,4,4-heptafluoro-1-butene; 1,1,1,2,3,4,4-heptafluoro-2-butene: 1,1,3,3,4,4,4-heptafluoro-1-butene; 1,1,2,3,4,4,4-heptafluoro-1-butene; 1,1,2,3,3,4,4-heptafluoro-1-butene; 2,3,3,4,4,4-hexafluoro-1-butene; 1,3,3,4,4,4-hexafluoro-1-butene; 1,2,3,4,4,4-hexafluoro-1-butene; 1,2,3,3,4,4-hexafluoro-1-butene; 1,1,2,3,4,4-hexafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,2,3,3,4-hexafluoro-1-butene; 1,1,2,3,4,4-hexafluoro-1-butene; 1,1,1,2,4-pentafluoro-2-butene; 1,1,1,3,4-pentafluoro-2-butene; 3,3,4,4,4-pentafluoro-1-butene; 1,1,1,4,4-pentafluoro-2-butene; 1,1,1,2,3-pentafluoro-2-butene; 2,3,3,4,4-pentafluoro-1-butene; 1,1,2,4,4-pentafluoro-2-butene; 1,2,3,3-pentafluoro-1-butene; 1,1,2,3,4-pentafluoro-2-butene; 2,3,4,4,4-pentafluoro-1-butene; 1,2,4,4,4-pentafluoro-1-butene; 1,3,4,4,4-pentafluoro-1-butene; 1,3,3,4,4-pentafluoro-1-butene; 1,2,3,4,4-pentafluoro-1-butene; 3,3,4,4-tetrafluoro-1-butene; 1,1,1,2-tetrafluoro-2-butene; 1,1,1,3-tetrafluoro-2-butene;

3,3,3-trifluoro-2-(trifluoromethyl)-1-propene; 1,1-difluoro-2-(difluoromethyl)-1-propene; 1,3,3,3-tetrafluoro-2-methyl-1-propene; 3,3-difluoro-2-(difluoromethyl)-1-propene; 1,1,3,3,3-pentafluoro-2-methyl-1-propene; 2-(difluoromethyl)-3,3,3-trifluoro-1-propene; 1,3,3,3-tetrafluoro-2-(trifluoromethyl)-1-propene;

1,1,1,2,4,4,5,5,5-nonafluoro-2-pentene; 1,1,1,3,4,4,5,5,5-nonafluoro-2-pentene; 1,2,3,3,4,4,5,5,5-nonafluoro-1-pentene; 1,1,3,3,4,4,5,5,5-nonafluoro-1-pentene; 1,1,2,3,3,4,4,5,5-nonafluoro-1-pentene; 1,1,2,3,4,4,5,5,5-nonafluoro-2-pentene; 1,1,1,2,3,4,4,5,5-nonafluoro-2-pentene; 1,1,1,2,3,4,5,5,5-nonafluoro-2-pentene;

2,3,3,4,4,5,5,5-octafluoro-1-pentene; 1,2,3,3,4,4,5,5-octafluoro-1-pentene;

3,3,4,4,5,5,5-heptafluoro-1-pentene; 2,3,3,4,4,5,5-heptafluoro-1-pentene; 1,1,3,3,5,5,5-heptafluoro-1-pentene; 3,4,4,5,5,5-hexafluoro-2-pentene; 3,3,4,5,5,5-hexafluoro-1-pentene;

1,1,1,4,4,4-hexafluoro-2-(trifluoromethyl)-2-butene; 1,2,3,4,4,4-hexafluoro-3-(trifluoromethyl)-1-butene; 1,1,2,4,4,4-hexafluoro-3-(trifluoromethyl)-1-butene; 1,1,1,4,4,4-hexafluoro-2-(trifluoromethyl)-2-butene; 1,1,3,4,4,4-hexafluoro-3-(trifluoromethyl)-1-butene; 3,3,4,4,4-pentafluoro-2-(trifluoromethyl)-1-butene; 1,1,4,4,4-pentafluoro-3-(trifluoromethyl)-1-butene; 1,3,4,4,4-pentafluoro-3-(trifluoromethyl)-1-butene; 1,1,4,4,4-pentafluoro-2-(trifluoromethyl)-1-butene; 3,4,4,4-tetrafluoro-3-(trifluoromethyl)-1-butene; 1,1,1,2,4,4,4-heptafluoro-3-methyl-2-butene; 2,4,4,4-tetrafluoro-3-(trifluoromethyl)-1-butene; 1,4,4,4-tetrafluoro-3-(trifluoromethyl)-1-butene; 1,1,1,4-tetrafluoro-2-(trifluoromethyl)-2-butene; 1,1,1,3-tetrafluoro-2-(trifluoromethyl)-2-butene; 1,1,1-trifluoro-2-(trifluoromethyl)-2-butene; 1,1,1,4,4,4-hexafluoro-2-methyl-2-butene; 4,4,4-trifluoro-2-(trifluoromethyl)-1-butene;

3,3,4,4,5,5,6,6,6-nonafluoro-1-hexene; 3,4,4,5,5,6,6,6-octafluoro-2-hexene; 3,3,4,4,5,5,6,6-octafluoro-1-hexene; 4,4,5,5,6,6,6-heptafluoro-2-hexene; 4,4,5,5,6,6,6-heptafluoro-1-hexene; 1,1,1,2,2,3,4-heptafluoro-3-hexene;

1,1,1,4,4,5,5,5-octafluoro-2-(trifluoromethyl)-2-pentene; 1,1,1,3,4,5,5,5-octafluoro-4-(trifluoromethyl)-2-pentene; 4,4,4-trifluoro-3,3-bis(trifluoromethyl)-1-butene; 1,1,1,4,4,4-hexafluoro-3-methyl-2-(trifluoromethyl)-2-butene; 2,3,3,5,5,5-hexafluoro-4-(trifluoromethyl)-1-pentene; 1,1,1,2,4,4,5,5,5-nonafluoro-3-methyl-2-pentene; 1,1,1,5,5,5-hexafluoro-4-(trifluoromethyl)-2-pentene; 1,1,1,4,4,5,5,5-pentafluoro-2-(trifluoromethyl)-2-pentene; 4,5,5,5-pentafluoro-2-(trifluoromethyl)-1-pentene; 3,3,4,4,5,5,5-heptafluoro-2-methyl-1-pentene; 4,5,5,5-tetrafluoro-4-(trifluoromethyl)-1-pentene; 1,1,1,2,5,5,5-heptafluoro-4-methyl-2-pentene; 1,1,1,3-tetrafluoro-2-(trifluoromethyl)-2-pentene; and the like;

perfluorinated olefins include:
1,1,1,2,3,4,4,4-octafluoro-2-butene; 1,1,2,3,3,4,4,4-octafluoro-1-butene, 1,1,1,2,3,4,4,5,5,5-decafluoro-2-pentene; 1,1,2,3,3,4,4,5,5,5-decafluoro-1-pentene; 1,1,2,3,3,4,4,5,5,6,6,6-dodecafluoro-1-hexene; 1,1,1,2,2,3,4,5,5,6,6,6-dodecafluoro-3-hexene; 1,1,1,4,4,4-hexafluoro-2,3-bis(trifluoromethyl)-2-butene; 1,1,1,2,3,4,5,5,5-nonafluoro-4-(trifluoromethyl)-2-pentene; and the like.

Often, the working fluid of the invention comprises a fluorinated or perfluorinated olefin of from 2 to 7 carbon atoms.

In some embodiments of the invention, the refrigerant is entirely hydrofluoro-olefins or perfluoro-olefins, for example, entirely hydrofluoro-olefins. In other embodiments, other known refrigerants are present, such as, hydrocarbon, fluorinated alkyne, hydrofluoro-alkane, perfluoroalkane or other halogenated refrigerants; carbon dioxide, ammonia and the like. Typically, the miscibility requirements of the lubricants with the fluorinated olefin of the invention can be met without the addition of solubility enhancers such as the perfluoro-ethers of U.S. Published Patent Application No. 2012/0011864.

Generally, at least 20% by weight of the refrigerants present in the working fluids of the invention are hydrofluoro-olefins or perfluoro-olefins, typically hydrofluoro-olefins; in some embodiments, 25 to 100 wt % are hydrofluoro-olefins or perfluoro-olefins. For example, in various embodiments of the invention, 25 to 75 wt %, 25 to 50 wt %, 50 to 100 wt %, 60 to 100 wt %, 75 to 100 wt %, 90 to 100 wt %, or 95 to 100 wt % of the refrigerants present in the working fluids of the invention are hydrofluoro-olefins or perfluoro-olefins.

In many embodiments employing blends of fluorinated olefins with other refrigerants, the refrigerant is a blend of fluorinated olefins with other fluorinated refrigerants such as fluorinated alkynes, hydrofluoro-alkanes, perfluoro-alkanes, or with hydrocarbon refrigerants, for example, alkanes, alkenes and alkynes having from 1 to 5 carbon atoms.

When adding other refrigerants along with the fluorinated olefins of the invention, care must be taken to ensure that miscibility and other desirable characteristics of the working fluid remain within useful parameters. For example, the alkane tetrafluoroethane and the olefin tetrafluoropropene are found in refrigerant blends, but the miscibility of each with high viscosity polyester lubricants are different and lubricants useful with one or the other may not be suitable with certain combinations of both together.

For example, attempts were made to meet the miscibility and viscosity requirements, e.g., ISO 220 grade, using only esters formed from di-pentaerythritol and mixtures of branched $C_9$ and linear $C_8$ and $C_{10}$ carboxylic acids, this viscosity could not be attained without including such a high amount of branched $C_9$ acid that the lubricant became too miscible with the hydrofluoro-olefin refrigerant. That is, these di-pentaerythritol esters rely heavily on the branched acids to build viscosity, but the high level of branched acids needed to attain high-viscosity lubricants leads to oils that absorb to much refrigerant under operating conditions. Thus, the working fluid viscosity of highly branched POEs is often too low in the presence of HFO refrigerants.

The use of oligomeric polyol esters blended with mono- and di-pentaerythritol esters may aid in obtaining high viscosity, but too much oligomeric material provides a lubricant that fails to work properly and exhibits cloudiness in miscibility tests. Further, after selecting an acceptable blend of mono-, di-, and oligomeric pentaerythritols to use as the polyol portion of the esters, it is found that only certain mixtures of carboxylates will provide the appropriate viscosity and miscibility with hydrofluoro-olefins for many demanding applications. For example, polyol esters with predominately $C_5$ carboxylate groups are excluded from the present invention due to unsuitable miscibility with fluorinated olefins. The polyol esters of the inventive working fluids are therefore defined by at least the relative amounts of mono-, di-, and oligomeric pentaerythritol esters, the ratio of branched to linear carboxylates, and the required amount of 07-10 alkylcarboxylate.

A series of polyol ester compositions were prepared for evaluation using standard industry tests for general effectiveness as a lubricant for mechanical devices, and also for effectiveness as a part of a working fluid containing R-1234ze. A sample of these comparative and inventive ester compositions are shown in Table 1, a fuller set of the lubricants are found in the Examples. In Table 1 the ratio of mono- to di- to tri- and higher pentaerythritol esters are reported as a weight % based on the total of polyol esters present in the composition as determined by gel permeation chromatography (GPC) and the carboxylate groups are reported in terms of the mole percent of each acid relative to the combined total moles of the carboxylic acids added during the esterification process. In the table, i-C5 represents a mixture of about 34% 2-methylbutanoic acid and 66% n-pentanoic acid; i-C9 represents 3,5,5-trimethylhexanoic acid; n-C8C10 represents a mixture primarily of n-octanoic and n-decanoic acid commercially available.

charged to a glass test tube. After sealing the open end of the tube, the liquid contents were visually observed while being slowly cooled and heated from about −60 C to about +70 C. It is common for lubricant-refrigerant combinations to exhibit both miscibility (only one homogeneous liquid phase present) and immiscibility (two liquid phases present) as the temperature changes. Generally, there is a low side miscibility limit below which the oil and lubricant separate into two distinct phases (an oil-rich phase and a lubricant-rich phase). Also, there may be a high-side miscibility limit above which the oil and lubricant separate into two phases. At temperatures between the high-side and low-side miscibility limits there exists a temperature range over which only one homogeneous liquid phase exists and it contains both oil and refrigerant.

In Table 2 below, the temperatures of the low-side and high-side miscibility limits are reported for sealed tubes containing an overall composition that is 10% lubricant and 90% R-1234ze. This composition was chosen because for the inventive lubricants it has the narrowest miscibility range (high-side limit to low-side limit) and is representative of liquid phase local concentrations existing in refrigeration system heat exchangers (condenser and evaporator).

Tests were also run to determine the impact of R-1234ze refrigerant on the properties of the lubricants in order to confirm the suitability of the inventive polyol ester lubricants in an R-1234ze-containing working fluid. The lubricant chosen for use with an R-1234ze refrigerant must not only be miscible with R-1234ze, but the lubricant must maintain adequate viscosity when refrigerant dissolves into it. The presence of R-1234ze in a lubricant is known to significantly lower its viscosity. The amount of refrigerant dissolved in the liquid phase was measured at representative conditions and is listed in the table below as "refrigerant fraction." The viscosity of the resulting lubricant-refrigerant liquid is called the "diluted viscosity" or "working viscosity" and is a function of temperature, pressure and the

TABLE 1

| | Kvis @ 40 C., cSt | Mole % of Each Acid | | | | | Pentaerythritol Polyol | | |
|---|---|---|---|---|---|---|---|---|---|
| | | n-C5 | i-C5 | n-C7 | i-C9 | n-C8C10 | Mono | Di | Tri & Higher |
| Comp A | 220 | 29 | 0 | 0 | 71 | 0 | 0 | 100 | 0 |
| Comp I | 220 | 0 | 0 | 50 | 0 | 50 | 25 | 19 | 56 |
| Comp J | 257 | 0 | 0 | 65 | 35 | 0 | 27 | 16 | 57 |
| Comp L | 220 | 0 | 30 | 70 | 0 | 0 | 22 | 12 | 65 |
| INV 2 | 217 | 0 | 0 | 1 | 60 | 39 | 35 | 19 | 46 |
| INV 3 | 215 | 0 | 0 | 1 | 65 | 34 | 37 | 19 | 44 |
| INV 4 | 220 | 0 | 0 | 1 | 70 | 29 | 37 | 20 | 42 |
| INV 6 | 320 | 0 | 0 | 1 | 65 | 34 | 30 | 17 | 53 |
| INV 7 | 313 | 0 | 0 | 1 | 80 | 19 | 36 | 20 | 44 |

It should be remembered that the relative amounts of polyol ester lubricant and R-1234ze refrigerant found in a working fluid in a heat transfer device can vary widely depending on the stage of the refrigeration cycle. For example, the working fluid can comprise from 1 to 99%, e.g., 2 to 98%, by weight of the polyol ester lubricant or from 1 to 99%, e.g., 2 to 98%, by weight of the refrigerant based on the combined weight of lubricant and refrigerant.

The relative amounts reported for sealed tube miscibility testing in the examples or data tables herein of lubricant to refrigerant ratios refer to the amounts of each component that are charged initially to the apparatus being used.

The miscibility of the lubricants of Table 1 with HFO was determined by using the industry standard sealed-tube method. Known quantities of lubricant and refrigerant were solubility of the refrigerant in the lubricant. The combination of properties (good miscibility, low solubility, high viscosity) is vital to an R-1234ze working fluid and is difficult to attain.

The viscosity and composition of lubricant/R-1234ze mixtures as a function of temperature and pressure were measured using a temperature controlled circulation loop apparatus comprising a pump, mass flow/density meter, high pressure viscometer, lubricant/refrigerant reservoir and pressure transducer. Details of the procedures and apparatus are found in the experimental section of the application. Measurements were collected in the temperature range from −10° C. to 120° C. and compositions of R-1234ze in lubricant from 0 to about 35 wt %. Refrigerant fraction and diluted viscosity data in Table 2 were obtained under temperature and pressures commonly encountered by HFO working fluids in commercial applications. Compositions of the invention exhibit acceptable viscosity over the range of temperatures and pressures describing the operating window of the system.

TABLE 2

| | Sealed Tube Test 10% Oil in Refrigerant | | Working Fluid Viscosity and Composition at Representative Conditions | |
|---|---|---|---|---|
| | Low Side Miscibility Limit | High Side Miscibility Limit | Refrigerant Fraction | Diluted Viscosity |
| Comp A | <−62° C. | >70° C. | 34.7 wt % | 3.3 cSt |
| Comp I | NM | NM | 30.1 wt % | 7.6 cSt |
| Comp J | −13° C. | 51° C. | — | — |
| Comp L | −15° C. | 32° C. | 32.1 wt % | 5.7 cSt |
| INV 2 | −12° C. | 71° C. | 32.5 wt % | 4.6 cSt |
| INV 3 | −27° C. | 72° C. | — | — |
| INV 4 | −41° C. | 73° C. | — | — |
| INV 7 | −44° C. | 72° C. | 32.8 wt % | 4.7 cSt |
| INV 6 | −8° C. | 64° C. | 31.9 wt % | 5.7 cSt |

N.M. = Not miscible over the temperature range observed

Comparative Example A exhibits excellent miscibility over a wide temperature range, but this composition has an unacceptably low diluted viscosity under representative compressor operating conditions. Comparative Example I has an acceptable diluted viscosity, but is not useful due to it being immiscible with R-1234ze. Comparative examples L and J have acceptable low-side miscibility limits but are not sufficiently miscible at higher temperatures, separating at 32 and 51° C. Inventive examples are miscible with R-1234ze over an acceptable temperature range, exhibit acceptable diluted viscosities, and have less affinity for the refrigerant than a traditional high viscosity ester such as Comparative Example A.

Not wanting to be bound by theory, it is believed that maintaining miscibility below temperatures of −60° C. may correlate generally with overly high refrigerant fraction and an undesirably low diluted viscosity as shown here for Comparative Example A. Such working fluids are unsuitable for the present invention, wherein the lubricants typically have a low end miscibility limit of from −1 to −55° C., and typically from −1 to −45° C. for an composition that is 10% lubricant and 90% R-1234ze measured as described above.

The polyol ester compositions of the invention thus demonstrate a superior combination of physical properties and performance characteristics and are ideally suited for use with R-1234ze in heat transfer working fluids.

Common additives which may also be present in the working fluid include antioxidants, extreme-pressure additives, antiwear additives, friction reducing additives, defoaming agents, profoaming agents, metal deactivators, acid scavengers and the like.

Examples of antioxidants that can be used include phenolic antioxidants such as 2,6-di-t-butyl-4-methylphenol and 4,4'-methylenebis(2,6-di-t-butylphenol); amine antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-containing antioxidants such as alkyl disulfide, thiodipropionic acid esters and benzothiazole; and zinc dialkyl dithiophosphate and zinc diaryl dithiophosphate.

Examples of extreme-pressure additives, antiwear additives, friction reducing additives that can be used include zinc compounds such as zinc dialkyl dithiophosphate and zinc diaryl dithiophosphate; sulfur compounds such as thiodipropinoic acid esters, dialkyl sulfide, dibenzyl sulfide, dialkyl polysulfide, alkylmercaptan, dibenzothiophene and 2,2'-dithiobis(benzothiazole); sulfur/nitrogen ashless antiwear additives such as dialkyldimercaptothiadiazoles and methylenebis(N,N-dialkyldithiocarbamates); phosphorus compounds such as triaryl phosphates such as tricresyl phosphate and trialkyl phosphates; dialkyl or diaryl phosphates; trialkyl or triaryl phosphites; amine salts of alkyl and dialkylphosphoric acid esters such as the dodecylamine salt of dimethylphosphoric acid ester; dialkyl or diaryl phosphites; monoalkyl or monoaryl phosphites; fluorine compounds such as perfluoroalkyl polyethers, trifluorochloroethylene polymers and graphite fluoride; silicon compounds such as a fatty acid-modified silicone; molybdenum disulfide, graphite, and the like. Examples of organic friction modifiers include long chain fatty amines and glycerol esters.

Examples of defoaming and profoaming agents that can be used include silicone oils such as dimethylpolysiloxane and organosilicates such as diethyl silicate. Examples of the metal deactivators that can be used include benzotriazole, tolyltriazole, alizarin, quinizarin and mercaptobenzothiazole. Furthermore, epoxy compounds such as phenyl glycidyl ethers, alkyl glycidyl ethers, alkylglycidyl esters, epoxystearic acid esters and epoxidized vegetable oil, organotin compounds and boron compounds may be added as acid scavengers or stabilizers.

Examples of moisture scavengers include trialkylorthoformates such as trimethylorthoformate and triethylorthoformate, ketals such as 1,3-dioxacyclopentane, and amino ketals such as 2,2-dialkyloxazolidines.

The working fluids comprising the present polyol esters and refrigerant can be used in a wide variety of refrigeration and heat energy transfer applications. Non-limiting examples include all ranges of air conditioning equipment from small window air conditioners, centralized home air conditioning units to light industrial air conditioners and large industrial units for factories, office buildings, apartment buildings and warehouses. Refrigeration applications include small home appliances such as home refrigerators, freezers, water coolers, vending machines and icemakers to large scale refrigerated warehouses and ice skating rinks. Also included in industrial applications would be cascade grocery store refrigeration and freezer systems. Heat energy transfer applications include heat pumps for house hold heating and hot water heaters. Transportation related applications include automotive and truck air conditioning, refrigerated semi-trailers as well as refrigerated marine and rail shipping containers.

EXAMPLES

The viscosity and composition of lubricant/R-1234ze mixtures as a function of temperature and pressure were measured using a temperature controlled circulation loop apparatus comprising a pump, mass flow/density meter, high pressure viscometer, lubricant/refrigerant reservoir and pressure transducer. Thermocouples are located at multiple locations in the loop as well as directly in the mass flow meter and viscometer. The design of the loop allows for continuous circulation of the liquid mixture as well as providing agitation to achieve rapid vapor-liquid equilibrium.

The lubricant was first charged to the system gravimetrically, the circulation loop was cooled to −10° C. and then the R-1234ze was charged gravimetrically in an amount necessary to achieve the desired overall R-1234ze/lubricant composition. For safety reasons the loop was not filled to capacity and a small vapor space existed at the top of the bulk reservoir, and a vapor space correction was applied to the composition to account for R-1234ze in the vapor phase. After charging, a gear pump circulated the liquid through the measurement devices. Bulk mixture pressure, liquid density, temperature, and viscosity were measured as the entire circulation loop was heated and cooled over the range of about 120° C. to −10° C.

Ester Compositions

The following polyol ester compositions were prepared using above cited methods. The ratio of mono- to di- to tri- and higher pentaerythritol esters are reported as a weight % of all such esters as determined by GPC and the carboxylate groups are reported in terms of mole % of each acid added to the esterification process based on total moles of acid used; i-$C_5$ is an industrial chemical product called isopentanoic acid which is a mixture of about 34% 2-methylbutanoic acid and 66% n-pentanoic acid; i-C9 is 3,5,5-trimethylhexanoic acid, known industrially as isononanoic acid; n-C8C10 is an industrial chemical product that is a mixture primarily of n-octanoic and n-decanoic acid and is commercially available from e.g., Proctor and Gamble Chemicals, as C-810 (NA).

| | Polyol Ester Compositions | | | | | | | | |
|---|---|---|---|---|---|---|---|---|---|
| | Viscosity cSt @ | Mole % of Each Acid Based on Total Moles Acid | | | | | Wt % Pentaerythritol Polyol | | |
| Example | 40° C. | n-C5 | i-C5 | n-C7 | i-C9 | n-C8 C10 | Mono | Di | Tri & Higher |
| Comp A | ~220 | 29 | 0 | 0 | 71 | 0 | 0 | 100 | 0 |
| Comp B | 400 | 0 | 0 | 0 | 100 | 0 | 0 | 100 | 0 |
| Comp C | 170 | 0 | 0 | 17 | 68 | 15 | 0 | 100 | 0 |
| INV 1 | 195 | 0 | 0 | 1 | 55 | 44 | 35 | 18 | 46 |
| INV 2 | 217 | 0 | 0 | 1 | 60 | 39 | 35 | 19 | 46 |
| INV 3 | 215 | 0 | 0 | 1 | 65 | 34 | 37 | 19 | 44 |
| INV 4 | ~220 | 0 | 0 | 1 | 70 | 29 | 37 | 20 | 42 |
| Comp D | 244 | 0 | 0 | 0 | 80 | 20 | 42 | 21 | 37 |
| Comp E | 233 | 0 | 50 | 0 | 50 | 0 | 35 | 20 | 45 |
| Comp F | 220 | 0 | 20 | 1 | 20 | 59 | 25 | 16 | 59 |
| Comp G | 189 | 0 | 30 | 1 | 30 | 39 | 29 | 17 | 54 |
| Comp H | 226 | 0 | 30 | 20 | 30 | 20 | 26 | 17 | 58 |
| INV 5 | 233 | 0 | 0 | 50 | 50 | 0 | 30 | 17 | 53 |
| Comp I | ~220 | 0 | 0 | 50 | 0 | 50 | 25 | 19 | 56 |
| Comp J | 257 | 0 | 0 | 65 | 35 | 0 | 27 | 16 | 57 |
| Comp K | 205 | 0 | 40 | 60 | 0 | 0 | 22 | 13 | 65 |
| Comp L | ~220 | 0 | 30 | 70 | 0 | 0 | 22 | 12 | 65 |
| INV 6 | 320 | 0 | 0 | 1 | 65 | 34 | 30 | 17 | 53 |
| INV 7 | 313 | 0 | 0 | 1 | 80 | 19 | 36 | 20 | 44 |
| Comp M | 346 | 0 | 0 | 1 | 90 | 9 | 39 | 20 | 42 |

The following table lists the mol % of branched carboxylates of the above polyol esters, based on total moles of carboxylic acid used in the esterification, and shows the low and high side miscibility limits of 10% of the polyol ester in R-1234ze.

| | Miscibility of 10% Polyol Ester Compositions in R-1234ze. | | | | | |
|---|---|---|---|---|---|---|
| | | Carboxylate | | | Miscibility | |
| Example | Kvis 40° C. cSt | Mol % C7-C10 Carboxylate | Mol % Branched Carboxylate | Pentaerythritol Mono/Di/Tri and Higher wt % | Low Side Limit | High Side Limit |
| Comp A | ~220 | 71 | 71 | 0/100/0 | <−62° C. | >70° C. |
| Comp B | 400 | 100 | 100 | 0/100/0 | −65° C. | 70° C. |
| Comp C | 170 | 100 | 68 | 0/100/0 | −65° C. | 70° C. |
| INV 1 | 195 | 100 | 55 | 35/18/46 | −9° C. | 60° C. |
| INV 2 | 217 | 100 | 60 | 35/19/46 | −12° C. | 71° C. |
| INV 3 | 215 | 100 | 65 | 37/19/44 | −27° C. | 72° C. |
| INV 4 | ~220 | 100 | 70 | 37/20/42 | −41° C. | 73° C. |
| Comp D | 244 | 100 | 80 | 42/21/37 | −60° C. | 73° C. |
| Comp E | 233 | 50 | 50 | 35/20/45 | −60° C. | 72° C. |
| Comp F | 220 | 80 | 27 | 25/16/59 | NM | NM |
| Comp G | 189 | 70 | 40 | 29/17/54 | −7° C. | 46° C. |
| Comp H | 226 | 70 | 40 | 26/17/58 | −29° C. | 55° C. |
| INV 5 | 233 | 100 | 50 | 30/17/53 | −43° C. | 74° C. |
| Comp I | ~220 | 100 | 0 | 25/19/56 | N.M. | N.M. |
| Comp J | 257 | 100 | 35 | 27/16/57 | −13° C. | 51° C. |
| Comp K | 205 | 60 | 14 | 22/13/65 | −36° C. | 44° C. |
| Comp L | ~220 | 70 | 10 | 22/12/65 | −15° C. | 32° C. |

Miscibility of 10% Polyol Ester Compositions in R-1234ze.

| Example | Kvis 40° C. cSt | Carboxylate | | | Miscibility | |
|---|---|---|---|---|---|---|
| | | Mol % C7-C10 Carboxylate | Mol % Branched Carboxylate | Pentaerythritol Mono/Di/Tri and Higher wt % | Low Side Limit | High Side Limit |
| INV 6 | 320 | 100 | 65 | 30/17/53 | −8° C. | 64° C. |
| INV 7 | 313 | 100 | 80 | 36/20/44 | −44° C. | 72° C. |
| Comp M | 346 | 100 | 90 | 39/20/42 | −62° C. | 72° C. |

N.M. = Not miscible over the temperature range observed

Each inventive lubricant comprises from 25 to 40 wt % mono-pentaerythritol estes; from 15 to 25 wt % di-pentaerythritol esters; from 40 to 55 wt % tri-pentaerythritol and higher pentaerythritol esters, 55-100% $C_{7-10}$ alkylcarboxylates, 50-80% of all alkylcarboxylates are branched and exhibit a low end miscibility limit for 10 wt % of polyol ester in R-1234ze of from −1 to −45° C.

What is claimed is:

1. A working fluid comprising:
   i) a fluorinated olefin refrigerant, and
   ii) a polyol ester lubricant composition having a kinematic viscosity at 40° C. of from 150 to 360 cSt, which polyol ester lubricant composition comprises:
      a) from 25 to 40 wt % $C_{5-12}$ alkylcarboxy esters of mono-pentaerythritol,
      b) from 15 to 25 wt % $C_{5-12}$ alkylcarboxy esters of di-pentaerythritol, and
      c) from 40 to 55 wt % $C_{5-12}$ alkylcarboxy esters of tri-pentaerythritol and higher pentaerythritol oligomers,
   wherein from 55 to 100 mol % of the alkylcarboxy groups are selected from $C_{7-10}$ alkylcarboxy, and from 50 to 80 mol % of all alkylcarboxy groups are branched.

2. The working fluid according to claim 1 wherein 70 to 100 mol % of the alkylcarboxy groups are selected from $C_{7-10}$ alkylcarboxy.

3. The working fluid according to claim 1 wherein 55 to 80 mol % of the alkylcarboxy groups are branched.

4. The working fluid according to claim 1 wherein from 28 to 39 wt % of the polyol ester lubricant composition consists of alkylcarboxy esters of mono-pentaerythritol.

5. The working fluid according to claim 1 wherein the polyol ester lubricant composition comprises:
   a) from 28 to 40 wt % $C_{5-12}$ alkylcarboxy esters of mono-pentaerythritol,
   b) from 16 to 24 wt % $C_{5-12}$ alkylcarboxy esters of di-pentaerythritol, and
   c) from 42 to 54 wt % $C_{5-12}$ wt % alkylcarboxy esters of tri-pentaerythritol and higher pentaerythritol oligomers.

6. The working fluid according to claim 1 wherein 51 to 100% of the branched alkylcarboxy groups are 3,5,5-trimethylhexanoyl or 2,2,4,4-tetramethylbutanoyl.

7. The working fluid according to claim 1 wherein the polyol ester lubricant composition has a kinematic viscosity at 40° C. of at least 160 cSt.

8. The working fluid according to claim 1 wherein the polyol ester lubricant composition has a kinematic viscosity at 40° C. of from 194 to 340 cSt.

9. The working fluid according to claim 1 wherein fluorinated olefin refrigerant comprises a hydrofluoro- or perfluoro-olefin of from 2 to 7 carbon atoms.

10. The working fluid according to claim 9 wherein hydrofluoro- or perfluoro-olefin contains three or more fluorine atoms.

11. The working fluid according to claim 10 wherein the hydrofluoro- or perfluoro-olefin contains four or more fluorine atoms.

12. The working fluid according to claim 10 wherein the hydrofluoro- or perfluoro-olefin comprises a pentafluoro-, tetrafluoro-, or trifluoro-propene isomer.

13. The working fluid according to claim 1 wherein fluorinated olefin refrigerant comprises a tetrafluoro-propene isomer.

14. The working fluid according to claim 1 wherein the fluorinated olefin refrigerant consists of hydrofluoro-olefins or perfluo-olefins.

15. The working fluid according to claim 1 wherein the fluorinated olefin refrigerant is a mixture comprising a hydrofluoro-olefin and/or perfluo-olefin, and a hydrocarbon, fluorinated alkyne, hydrofluoro-alkane and/or perfluoroalkane refrigerant.

16. The working fluid according to claim 15 wherein the fluorinated olefin refrigerant is a mixture comprising a hydrofluoro-olefin and a hydrofluoro-alkane.

* * * * *